UNITED STATES PATENT OFFICE.

CHAUNCEY C. HUTCHINS, OF GRAND RAPIDS, MICHIGAN.

COMPOSITION FOR REMOVING WALL-PAPER, CALCIMINE, &c.

1,066,017.     Specification of Letters Patent.     Patented July 1, 1913.

No Drawing.     Application filed January 29, 1912. Serial No. 673,969.

*To all whom it may concern:*

Be it known that I, CHAUNCEY C. HUTCHINS, a citizen of the United States, residing at Grand Rapids, in the county of Kent and State of Michigan, have invented a new and useful composition for removing wall-paper, calcimine, alabastine, and like wall-finishes from walls, ceilings, and surfaces to which the same may be attached by paste, glue, and other adhesive substance, of which the following is a specification.

My invention relates to a composition of matters in liquid form which when applied to wall paper, calcimine, alabastine and like wall finishes will penetrate directly one and several thicknesses of the above mentioned wall finishes and any combination of said above mentioned wall finishes and will destroy the adhesiveness of the paste, glue or other adhesive substance or substances by which the above mentioned wall finishes may be attached to the wall or other surfaces, and will release the above mentioned wall finishes free and clear from the surface to which attached with the result that the wall paper, calcimine, alabastine and other like wall finishes may be removed freely and entirely from the walls and surface to which attached. Its composition is shown by the following formula and method of preparation. The commercial names of the ingredients are used.

The composition is composed of sixty-four parts, and is compounded in the following manner and proportions: Dissolve one part of potash and two parts of chlorid of lime in nine parts of clear water, add thereto thirty-two parts of naphtha, eight parts of turpentine, eight parts of wood alcohol and four parts of ammonia, mixing all together thoroughly. This composition should be diluted in three gallons of water before application.

Having thus described my invention, what I claim to have patented, and desire to secure by Letters Patent, is,

1. A composition of matter for the removal of wall facings or coverings composed of sixty-four parts in the following proportions, one part of potash, two parts of chlorid of lime, nine parts of clear water, thirty-two parts of naphtha, eight parts of turpentine, eight parts of wood alcohol and four parts of ammonia.

2. A composition of matter for penetrating wall paper and destroying the adhesiveness of the paste, glue or other adhesive substance, composed of potash, chlorid of lime, water, naphtha, turpentine, wood alcohol and ammonia.

In testimony whereof, I have hereunto set my hand in the presence of two subscribing witnesses.

CHAUNCEY C. HUTCHINS.

Witnesses:
MARTIN H. CARMODY,
NORA G. MALONEY.

Copies of this patent may be obtained for five cents each, by addressing the "Commissioner of Patents, Washington, D. C."

---

Naphtha;
Turpentine;
Wood alcohol;
Ammonia.

Wilson, 122,094, Dec. 19, 1871,
                           (87-5, Caustic);
David, 278,409, May 29, 1883,
                           (87-5, Caustic);
Elliott, 147,250, Feb. 10, 1874,
                           (87-5, Suint);
Wegerdt, 618,592, Jan. 31, 1899,
                           (87-5, P.R.V.S.).